United States Patent
Paul

(10) Patent No.: US 8,099,906 B2
(45) Date of Patent: Jan. 24, 2012

(54) WATER DEFLECTOR AND SYSTEM HAVING MULTIPLE WATER DEFLECTORS OF THIS TYPE

(75) Inventor: Carsten Paul, Garstedt (DE)

(73) Assignee: Airbus Deutschland GmbH (DE)

( * ) Notice: Subject to any disclaimer, the term of this patent is extended or adjusted under 35 U.S.C. 154(b) by 190 days.

(21) Appl. No.: 11/992,173

(22) PCT Filed: Sep. 25, 2006

(86) PCT No.: PCT/EP2006/009289
§ 371 (c)(1),
(2), (4) Date: Mar. 25, 2009

(87) PCT Pub. No.: WO2007/039169
PCT Pub. Date: Apr. 12, 2007

(65) Prior Publication Data
US 2009/0300991 A1    Dec. 10, 2009

Related U.S. Application Data

(60) Provisional application No. 60/720,639, filed on Sep. 26, 2005.

(30) Foreign Application Priority Data

Sep. 26, 2005  (DE) .......................... 10 2005 045 969

(51) Int. Cl.
*E06B 7/16*    (2006.01)
(52) U.S. Cl. ...................... 49/476.1; 49/500.1; 49/493.1

(58) Field of Classification Search .................. 49/475.1, 49/493.1, 500.1, 496.1, 476.1, 498.1; 296/146.9, 296/146.2, 201, 93
See application file for complete search history.

(56) References Cited

U.S. PATENT DOCUMENTS

| | | | |
|---|---|---|---|
| 3,458,241 A * | 7/1969 | Barnard et al. | 312/228 |
| 3,596,980 A * | 8/1971 | Cadiou | 296/154 |
| 3,938,856 A * | 2/1976 | Janssen | 296/154 |
| 4,312,153 A * | 1/1982 | Parkinson et al. | 49/496.1 |
| 4,617,857 A * | 10/1986 | Kedzierski | 92/88 |
| 4,984,843 A * | 1/1991 | Villa et al. | 296/213 |

(Continued)

FOREIGN PATENT DOCUMENTS
DE    22 09 190    8/1973
(Continued)

OTHER PUBLICATIONS

Russian Notice Action No. 2008116156/11(018238), dated Jan. 12, 2011.

*Primary Examiner* — Jerry Redman
(74) *Attorney, Agent, or Firm* — Lerner, David, Littenberg, Krumholz & Mentlik, LLP

(57) ABSTRACT

A water deflector includes a water-diverting area and an attachment area for attachment to a seal profile. The water-diverting area and the attachment area are connected to one another via a connection area, which is elastically deformable in such a way that when force acts on the water-diverting area, it is movable in relation to the attachment area. The water deflector can be used in the area of a door, wherein the water deflector deforms when the door is closed and comes to rest in a cavity between the seal profile and the door outer skin, and assumes its starting shape again when the door is opened.

10 Claims, 2 Drawing Sheets

U.S. PATENT DOCUMENTS

Figure 1:
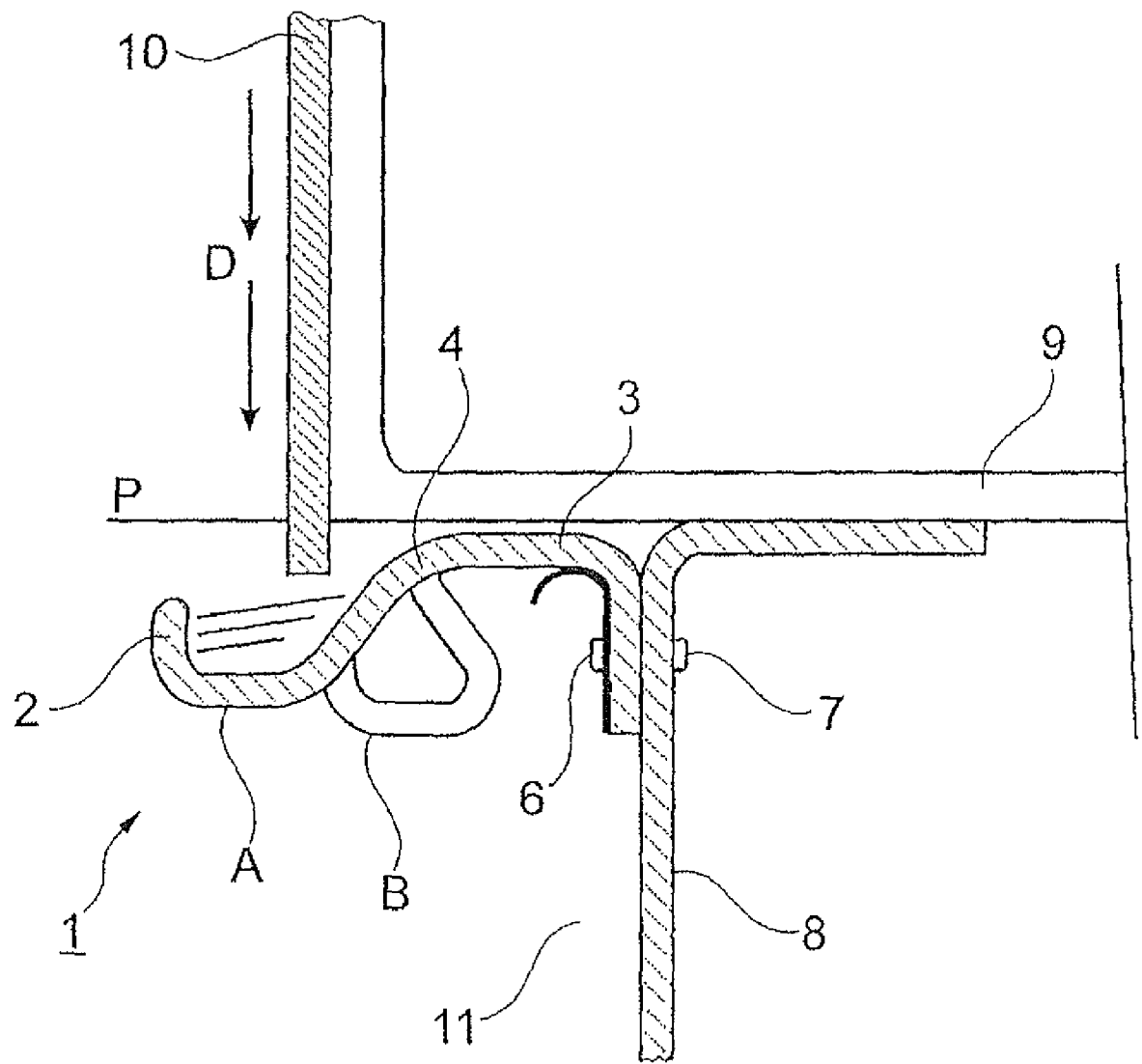

| | | | |
|---|---|---|---|
| 5,106,149 A | * 4/1992 | Glossop et al. | 296/213 |
| 5,115,826 A | * 5/1992 | Bertsch et al. | 134/183 |
| 5,282,338 A | 2/1994 | Oliver | |
| 5,307,591 A | * 5/1994 | Usuta et al. | 49/476.1 |

FOREIGN PATENT DOCUMENTS

| | | |
|---|---|---|
| DE | 69 102 043 T2 | 9/1994 |
| DE | 199 21 326 C1 | 6/2000 |
| EP | 0 304 981 | 3/1989 |
| EP | 0 480 747 | 4/1992 |
| JP | 58214411 A * | 12/1983 |
| JP | 06092147 A * | 4/1994 |
| RU | 2170803 C2 | 7/2001 |

* cited by examiner

WATER DEFLECTOR AND SYSTEM HAVING MULTIPLE WATER DEFLECTORS OF THIS TYPE

This application claims the benefit of the filing date of U.S. Provisional Patent Application No. 60/720,639 filed Sep. 26, 2005 and of German Patent Application No. 10 2005 045 969.2 filed Sep. 26, 2005, the disclosures of which are hereby incorporated herein by reference.

FIELD OF THE INVENTION

The present invention relates to a water deflector and a system having multiple water deflectors of this type, and particularly a water deflector which is used as a rain gutter to be employed in the door area of aircraft.

BACKGROUND OF THE INVENTION

Especially in the door area of aircraft, the problem occurs that rain water which is still between the seal profile of the jetway (Fingersteig) and the outer skin of the aircraft drips downward when the door is open and may hit an aircraft passenger going through the door.

SUMMARY OF THE INVENTION

There may be a need to find a possibility, using which an aircraft passenger may leave the aircraft without water dripping on his head.

This need may be met by a water deflector and system according claims 1 and 7. Advantageous embodiments of the present invention are specified in the dependent claims.

According to an exemplary embodiment of the present invention, the water deflector comprises a water-diverting area and an attachment area for attachment to a seal profile. The water-diverting area and the attachment area are connected to one another via a connection area, at least the connection area being elastically deformable in such a way that when a force acts on the water-diverting area, it is movable in relation to the attachment area.

The water deflector according to an exemplary embodiment of the present invention is preferably implemented in one piece or integrally, from hard rubber or a similar material, for example. Preferably, a preformed rubber profile is taken and mounted on the existing, frame-side seal profile of the door seal as the water deflector.

According to another exemplary embodiment of the present invention, the attachment area of the water deflector (the rubber profile) is attached to the seal profile via a holding plate using a screw and a rivet nut or a riveted connection.

According to another exemplary embodiment of the present invention, the water deflector has an essentially S-shaped cross-sectional profile.

The principle according to an exemplary embodiment of the present invention may be based on the water deflector deforming and coming to rest in a cavity between the seal profile and the door outer skin when the door is closed and assuming its starting shape again when the door is opened, the water-diverting area of the water deflector projecting out beyond outer skin of the aircraft when the door is open.

A system according to an exemplary embodiment of the present invention contains multiple above-mentioned water deflectors, for example, a first water deflector having a linear rubber profile, and a second and a third water deflector each being situated on the ends of the linear rubber profile and having a round rubber profile, which has the contour of door cutout radii of a door. The linear and the round rubber profiles preferably have an S-shaped cross-section.

The individual water deflectors are welded to one another or connected suitably in another way at their transitions, for example, so that no water may penetrate at the transitions.

SHORT DESCRIPTIONS OF THE DRAWINGS

In the following, preferred exemplary embodiments of the present invention are described with reference to the attached drawing.

Figure 2:
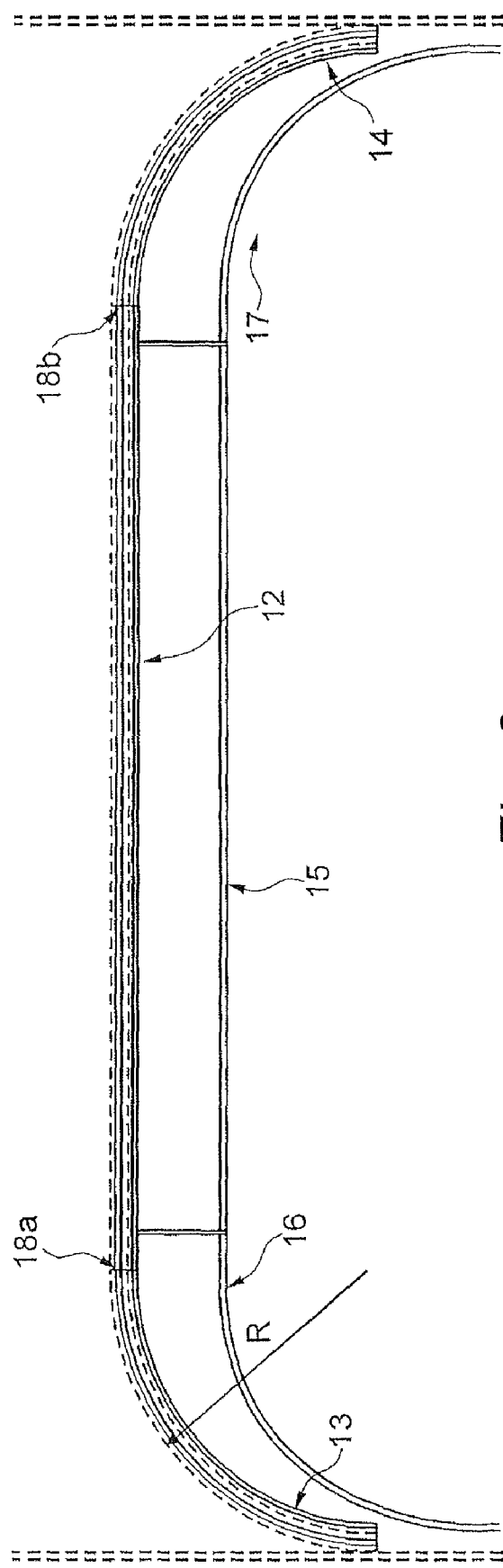

FIG. 1 shows a partial cross-sectional view of a mounted water deflector according to an exemplary embodiment of the present invention from the side; and FIG. 2 shows a system having multiple water deflectors of FIG. 1 according to an exemplary embodiment of the present invention.

DETAILED DESCRIPTION OF AN EXEMPLARY EMBODIMENT

In the following, identical reference signs identify identical or corresponding components in the various views of the figures.

FIG. 1 shows a partial cross-sectional view which illustrates how a water deflector 1 according to an exemplary embodiment is mounted.

As shown in FIG. 1, the water deflector 1 contains a water-diverting or water-draining area 2, which is used as a rain or eaves gutter, an attachment area 3, and a connection area 4, which connects the water-diverting area 2 to the attachment area 3.

According to the exemplary embodiment, the water deflector 1 is implemented in one piece, for example, and comprises or consists of a hard rubber material or a similar material which allows elastic deformation of the water deflector.

At least the connection area 4 is elastically deformable in such a way that when a force acts on the water-diverting area 2, it is movable in the direction of the attachment area 3 and may be brought into a state B, as shown in FIG. 1. When a force no longer acts on the water-diverting area 2, the water deflector 1 assumes its original starting shape again (state A in FIG. 1).

As shown in FIG. 1, the attachment area 3 is attached to a seal profile 8 via a holding plate 5 using a screw 6 and a rivet nut 7. The seal profile 8 is a U-profile, for example, to one leg of which the attachment area 3 is attached. The seal profile 8 is attached to a longitudinal girder 9 using the other leg, for example, welded, riveted, etc.

According to an exemplary embodiment, an end of the holding plate or holding-down sheet 5 which points toward the longitudinal girder 9 is implemented as curved to ensure a secure contact of the attachment area 3 to the seal profile 8 and the longitudinal girder 9. The attachment area 3 of the water deflector 1 lies, in the mounted state, between the curved end of the holding plate 5 and the longitudinal girder 9 and between the essentially linear section of the holding plate 5 and the seal profile 8. The leg of the seal profile 8 to which the attachment area 3 of the water deflector 1 is attached extends essentially perpendicular to the leg of the longitudinal girder 9 which is attached to the other leg of the seal profile 8.

The longitudinal girder 9 is a U-profile, for example, on whose leg which is not attached to the seal profile 8, an outer planking 10 is fastened, the water-diverting area 2 projecting beyond the outer planking 10 in state A in such a way that water running down the outer planking 10 (indicated by the arrows D) runs down and is captured in the water-diverting area 2, as shown in FIG. 1.

When the door is closed (not shown), the water deflector 1 deforms in such a way that the water-diverting area 2 is brought from the state A into the state B and comes to rest in the cavity 11 between the seal profile 8 and the door outer skin (not shown). When the door is opened, the water deflector 1 assumes its starting shape again, the water-diverting area 2 returning from the state B back into the state A to capture and divert water D running down the outer planking 10, as explained in greater detail below with reference to FIG. 2.

FIG. 2 shows a system having multiple water deflectors of FIG. 1 according to a preferred exemplary embodiment of the present invention.

FIG. 2 shows a first water deflector 12 which has a linear profile. A second water deflector 13 and a third water deflector 14, each of which has a round profile which corresponds to the contour of the door cutout radii of a respective aircraft type, are located on the left and right of the first water deflector 12 in FIG. 2.

According to an exemplary embodiment, the first water deflector 12 is attached to a middle seal profile 15, as explained with reference to FIG. 1, and the second and third water deflectors 13, 14 are attached in a similar way to a left seal profile 16 and a right seal profile 17, respectively.

The three water deflectors 12, 13, 14 are welded to one another at transitions 18a, 18b.

Using the system shown in FIG. 2, residual rain water which still penetrates between the seal profile 15, 16, 17 and the outer planking may be captured and diverted to the side, where it flows downward in the profile of the door seal. An aircraft passenger may thus leave the aircraft without water dripping on his head.

Although the present invention was described above with reference to use in an aircraft, it is obvious that other areas of application in other vehicles are possible in which the same problem occurs.

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

LIST OF REFERENCE SIGNS 1 water deflector
2 water-diverting area
3 attachment area
4 connection area
5 holding plate
6 screw
7 rivet nut (Anjätmutter)
8 seal profile
9 longitudinal girder
10 outer planking
11 cavity
12 first linear water deflector
13 second round water deflector
14 third round water deflector
15 middle seal profile
16 left seal profile
17 right seal profile
18a,b transitions
A starting state
B state upon force action
D water

The invention claimed is:

1. A water deflector comprising:
a water-diverting area at one end of the water deflector and an attachment area for attachment to a seal profile at another end of the water deflector,
the water-diverting area and the attachment area being connected to one another via a connection area arranged between the water-diverting area and the attachment area along one continuous length, the connection area being elastically deformable such that when a force acts on the water-diverting area, the water-diverting area is movable in relation to the attachment area, and when the force does not act on the water-diverting area a far end of the water-diverting area is essentially parallel to a far end of the attachment area;
wherein the water-diverting area, the connection area and the attachment area have an essentially S-shaped cross-sectional profile along their continuous length.

2. The water deflector of claim 1, wherein the water deflector comprises one piece having a pre-shaped rubber profile.

3. The water deflector of claim 1, wherein the attachment area is attachable to the seal profile via a holding plate using a screw and a rivet nut or a rivet.

4. The water deflector of claim 1, wherein the water deflector is positionable in the area of a door and deforms when the door is closed and comes to rest in a cavity between the seal profile and the door outer skin, and assumes its starting shape again when the door is opened.

5. The water deflector of claim 4, wherein the outer planking is part of an aircraft.

6. The water deflector of claim 1, wherein the water-diverting area of the water deflector projects out beyond an outer planking when the door is open.

7. A system comprising a plurality of water deflectors each extending along a continuous length from end to end, the continuous length comprising a water-diverting area and an attachment area for attachment to a seal profile, the end of the water-diverting area opposite the end of the attachment area being substantially parallel to each other;
wherein the water-diverting area, and the attachment area are connected to one another via a connection area, which is elastically deformable such that when a force acts on the water-diverting area, it is movable in relation to the attachment area, and
wherein the water deflector has an essentially S-shaped cross-sectional profile,
said system further comprising a first water deflector having a linear rubber profile, on one end of which a second water deflector and on the other end of which a third water deflector are situated, each of which has a round rubber profile which corresponds to a contour of door cutout.

8. The system of claim 7, wherein the plurality of water deflectors are welded to one another at their transitions.

9. The water deflector of claim 1, wherein the water-diverting area is moveable toward the attachment area when the force acts on the water-diverting area.

10. The water deflector of claim 1, wherein when the force acts on the water-diverting area a far end of the water-diverting area is essentially parallel to the far end of the attachment area.

* * * * *